United States Patent [19]
Laing et al.

[11] 3,814,175

[45] June 4, 1974

[54] VARIABLE INSULATION MEANS UTILIZING CONVECTION GENERATORS

[76] Inventors: Ingeborg Laing; Nikolaus Laing, both of Hofener Weg 35-37, 7141 Aldingen bei Stuttgart, Germany

[22] Filed: Feb. 26, 1973

[21] Appl. No.: 335,769

Related U.S. Application Data

[62] Division of Ser. No. 830,457, June 4, 1969, Pat. No. 3,720,198.

[52] U.S. Cl. ................... 165/96, 126/400, 165/104
[51] Int. Cl. ............................................. F28f 27/00
[58] Field of Search ............. 165/96, 104; 126/400; 62/383

[56] References Cited
UNITED STATES PATENTS

| | | | |
|---|---|---|---|
| 3,048,375 | 8/1962 | Walker | 165/96 X |
| 3,163,892 | 1/1965 | Hager, Jr. | 165/96 |
| 3,225,820 | 12/1965 | Riordan | 165/96 |
| 3,367,413 | 2/1968 | Forster | 165/96 |

FOREIGN PATENTS OR APPLICATIONS

| | | | |
|---|---|---|---|
| 80,812 | 7/1934 | Sweden | 165/96 |
| 493,130 | 12/1936 | Great Britain | 165/96 |

*Primary Examiner*—William E. Wayner
*Assistant Examiner*—William C. Anderson
*Attorney, Agent, or Firm*—Pennie & Edmonds

[57] ABSTRACT

Variable heat insulation building panel having an outwardly facing wall, an inwardly facing wall, a chamber between the walls and a means for creating eddy currents in the chamber to promote transfer of heat between the two walls in order to reduce insulation effect of the panel.

4 Claims, 2 Drawing Figures

VARIABLE INSULATION MEANS UTILIZING CONVECTION GENERATORS

REFERENCE TO OTHER APPLICATIONS

This application is a division of our co-pending U.S. Pat. application Ser. No. 830,457 filed June 4, 1969 and now U.S. Pat. No. 3,720,198.

BACKGROUND OF THE INVENTION

The invention relates generally to an insulation means which is designed for use as an insulated building panel and which includes means for varying the insulation properties of the panel. The construction industry requires for the most part insulation panels having high insulating properties and desirably, panels which may also have structural properties in order to be easily included in building structures. In the past, panels having good insulation properties, i.e., equal to that of thick brick walls, have usually been of massive construction and consequently expensive. Further, such panels have lacked means to effectively vary the insulation properties which is a desirable feature during different parts of the day when outdoor temperature may vary over a substantial range. For example, during the summer, it is desirable to have an insulating panel having good insulation properties during the daytime in order to prevent the exterior heat entering into a room. However, during the night when the temperature outside may drop below the temperature inside a room, it then may be desirable to have a panel of low insulation properties in order to allow the transfer of heat from the interior of a room to the exterior. At other times, as during the winter, it may be desirable to have the panel absorb solar heat and to transfer the same to the interior of a room.

Broadly the invention contemplates an insulation means having an outwardly facing wall, a second wall spaced from the outwardly facing wall, a hermetic chamber between the walls adapted to be filled with air or other gas and a moveable reflector sheet in the chamber having perforations therein. Sheet moving means are provided for moving the sheet so as to impart eddy currents of air or gas in the chamber which would increase the conductive heat transfer between the two wall members. Fins may be included on the walls within the chamber to increase the effective area of the walls subjected to the moving air currents.

The invention also contemplates in some forms of the insulation means including a heat storage element in thermal contact with one of the walls where the element comprises a heat storage substance having high latent heat properties. The heat storage element may thereby serve to absorb heat during the day of a room which may then be transferred to the exterior during the cooler night.

DETAILED DESCRIPTION OF THE PREFERRED EMBODIMENT

Figures 1, 2:
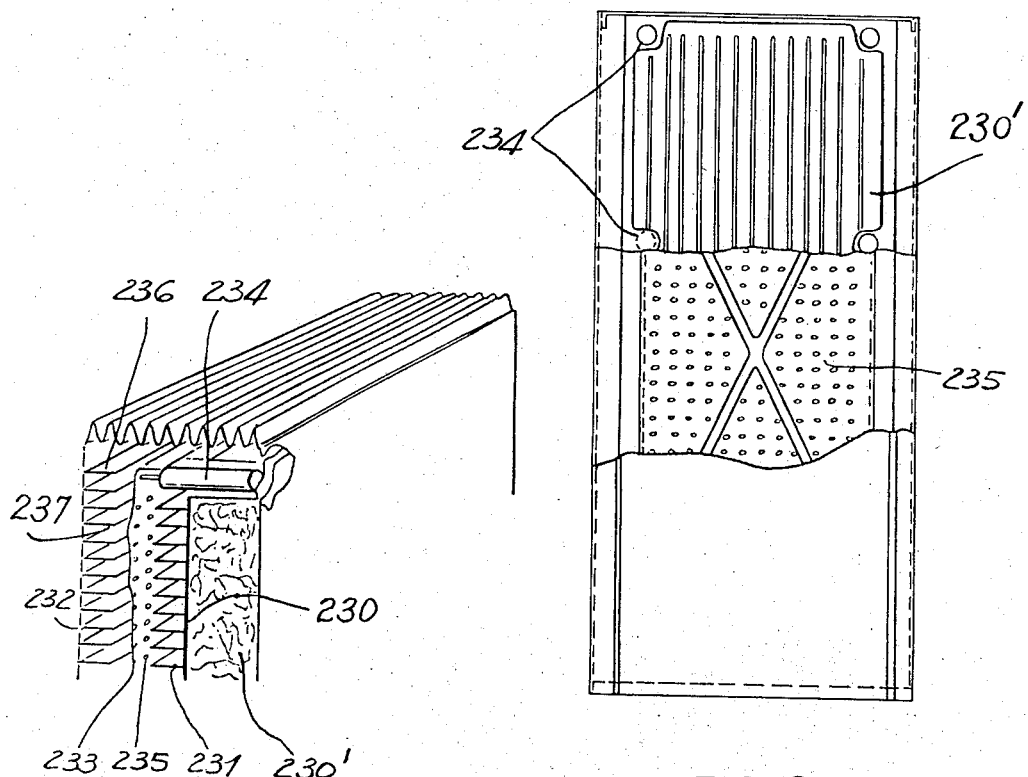
FIG. 1 is a perspective sectional view of an insulation means constructed according to the invention.
FIG. 2 is a broken side view of the insulation means of FIG. 1.

The insulation means as illustrated in FIG. 1 comprises an outer wall 232 adapted to face the exterior of a room or a building and an inner wall 230 which in part forms a hermetic chamber 237 between the walls. A reflector sheet 233 is moveably mounted in the chamber between the walls and has therein a plurality of perforations 235.

Electromagnetic vibrators 234 serve to move sheet 235 in the chamber and thus create eddy currents of air or gas which may pass through the perforations 235 and thus transfer heat from one wall to the other wall. Preferably the vibrators are energized by an alternating current of subsonic frequency such that the perforations 235 will act as nozzles when the sheet 235 is moved at subsonic frequency.

Fins 231 and 232 are mounted on the walls within the chamber and serve to effectively increase the heat transfer area of the walls that will be subjected to the eddy currents while at the same time reducing convection flow when the sheet 235 is at rest.

In addition a heat storage element 230' may be included and bounded to one side by the wall 230. Preferably the heat storage element contains a heat storage mass having high latent heat transition from a solid state to a liquid state.

The operation of the device is as follows. During a hot summer day the solenoids of the electromagnetic vibrators are deenergized such that no eddy currents will form within the chamber and no air will pass through the perforations 235. The quiescent air or gas in the chamber will act as an insulator and prevent transfer of heat from the outer wall 232 which is subjected to the sun rays to the inner wall 230. In addition, the sheet 233 being reflective, will reduce any transfer of heat by radiation. In the event it is wished to increase the transfer of heat between the two walls, the electromagnetic vibrators 234 are energized thus moving the reflector sheet 235 which will cause air to pass through the perforations 234 and transfer heat from one wall and its fins to the other wall and its fins. This would occur normally on a summer night when the wall 230 is warmer than the exterior wall 232 and where it is desired to transfer heat from the wall 230 to the wall 232. Where a heat storage element 230' is utilized, the heat storage element during the daytime when the solonoids are deenergized will act to absorb heat from the room to provide a cooling effect. This heat will then be transferred to the exterior wall 232 at night when the vibrators are energized.

The insulation means shown is also applicable for wintertime use when it is desired to utilize solar heat to help warm the interior of a room. In this instance the timing of the operation would be reversed with the vibrators being energized during the day so as to transfer solar heat from the wall 232 to the wall 230, and if a heat storage element is used, subsequently to the heat storage element. At night or any time in which the solar energy acting on the wall 232 were insufficient to cause a heat transfer, the vibrators would be deenergized whereby the insulation properties of the insulation means would be increased.

What is claimed is:

1. Variable insulation means adapted to form part of a wall of a room comprising a hollow body member having an outer wall adapted to face the exterior of the room and an oppositely disposed inner wall spaced from said outer wall wherein said walls form in part a hermetic chamber within said body member, characterized in that a reflector sheet having a plurality of perforations therein is movably mounted in said chamber between said walls and in having means for moving said sheet whereby eddy currents may be generated in said chamber to transfer heat from one wall to the other wall and thus reduce the insulation properties of said insulation means.

2. Variable insulation means according to claim 1 wherein said sheet moving means comprises electromagnetic vibrators.

3. Variable insulation means according to claim 1 wherein one of said walls is thermally connected to a heat storage element comprising a heat storage material which has a latent heat of transition from a solid state to a liquid state.

4. Variable insulation means according to claim 1 wherein said walls have a plurality of fins thereon extending into said chamber to increase the effective area of the walls which are subjected to contact by the eddy currents.

* * * * *